(12) United States Patent
Bradshaw et al.

(10) Patent No.: US 10,628,212 B2
(45) Date of Patent: Apr. 21, 2020

(54) INCREMENTAL PARALLEL PROCESSING OF DATA

(71) Applicant: Google LLC, Mountain View, CA (US)

(72) Inventors: Robert Bradshaw, Seattle, WA (US);
Craig D. Chambers, Seattle, WA (US);
Ezra Cooper, Seattle, WA (US);
Ashish Raniwala, Bellevue, WA (US);
Frances J. Perry, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/030,183

(22) Filed: Jul. 9, 2018

(65) Prior Publication Data
US 2018/0314545 A1    Nov. 1, 2018

Related U.S. Application Data

(63) Continuation of application No. 14/989,867, filed on Jan. 7, 2016, now Pat. No. 10,025,620, which is a
(Continued)

(51) Int. Cl.
*G06F 9/44* (2018.01)
*G06F 17/30* (2006.01)
(Continued)

(52) U.S. Cl.
CPC .............. *G06F 9/466* (2013.01); *G06F 8/453* (2013.01); *G06F 9/3867* (2013.01);
(Continued)

(58) Field of Classification Search
CPC ........ G06F 8/443; G06F 8/4434; G06F 8/456; G06F 8/20; G06F 8/314; G06F 9/30036;
(Continued)

(56) References Cited

U.S. PATENT DOCUMENTS 5,197,140 A  *  3/1993  Balmer ............... G06F 9/30036
                                                       708/518
5,212,777 A  *  5/1993  Gove .................. G06F 9/30087
                                                       711/118
(Continued)

FOREIGN PATENT DOCUMENTS

CN          1875590 A       12/2006
CN          103092840 A      5/2013

OTHER PUBLICATIONS

Sarmad Makhdoom et al., Incremental symbolic exedcution for automated test suite maintenance, Sep. 15-19, 2014, [Retrieved on Jan. 3, 2020]. Retrieved from the internet: <URL: https://dl.acm.org/citation.cfm?id=2642961> 6 Pages (271-276) (Year : 2014).*
(Continued)

*Primary Examiner* — Anibal Rivera
(74) *Attorney, Agent, or Firm* — Fish & Richardson P.C.

(57) ABSTRACT

One example method includes identifying synchronous code including instructions specifying a computing operation to be performed on a set of data; transforming the synchronous code into a pipeline application including one or more pipeline objects; identifying a first input data set on which to execute the pipeline application; executing the pipeline application on a first input data set to produce a first output data set; after executing the pipeline application on the first input data set, identifying a second input data set on which to execute the pipeline application; determining a set of differences between the first input data set and second input data set; and executing the pipeline application on the set of differences to produce a second output data set.

19 Claims, 5 Drawing Sheets

Related U.S. Application Data continuation of application No. 14/231,983, filed on Apr. 1, 2014, now Pat. No. 9,268,597.

(51) Int. Cl.
    *G06F 9/46*     (2006.01)
    *G06F 9/455*     (2018.01)
    *G06F 9/38*     (2018.01)
    *G06F 8/41*     (2018.01)
    *G06F 9/50*     (2006.01)
    *G06F 11/30*     (2006.01)
    *G06F 16/25*     (2019.01)
    *G06F 16/2453*     (2019.01)
    *G06F 16/51*     (2019.01)
    *G06F 16/23*     (2019.01)

(52) U.S. Cl.
CPC ............ *G06F 9/3885* (2013.01); *G06F 9/455* (2013.01); *G06F 9/5066* (2013.01); *G06F 11/3006* (2013.01); *G06F 16/235* (2019.01); *G06F 16/24534* (2019.01); *G06F 16/24542* (2019.01); *G06F 16/258* (2019.01); *G06F 16/51* (2019.01)

(58) Field of Classification Search
CPC .... G06F 9/542; G06F 9/3824; G06F 9/30087; G06F 9/30014; G06F 9/3851; G06F 9/3001; G06F 9/3867; G06F 9/30; G06F 9/30; G06F 9/30181; G06F 17/30215; G06F 17/5027; G06F 17/5045; G06F 11/261; G06F 11/2236; G06F 15/17375; G06F 7/785; G06F 16/283; G06F 16/2228; G06F 16/24534; G06F 16/51; G06F 11/2094; G06F 21/564; G06F 21/55; G06F 8/73; G06F 9/5027

See application file for complete search history.

(56) References Cited

U.S. PATENT DOCUMENTS

| | | | |
|---|---|---|---|
| 5,239,654 A * | 8/1993 | Ing-Simmons | G06F 9/30014 712/20 |
| 5,517,666 A | 5/1996 | Ohtani et al. | |
| 5,522,083 A * | 5/1996 | Gove | G06F 15/17375 712/20 |
| 5,530,804 A * | 6/1996 | Edgington | G06F 11/2236 703/28 |
| 5,574,927 A * | 11/1996 | Scantlin | G06F 9/30036 703/23 |
| 5,615,349 A * | 3/1997 | Matsuo | G06F 9/3001 712/212 |
| 5,768,609 A * | 6/1998 | Gove | G06F 15/17375 712/11 |
| 5,784,636 A | 7/1998 | Rupp | |
| 5,991,308 A * | 11/1999 | Fuhrmann | H03M 13/256 370/395.53 |
| 6,018,756 A | 1/2000 | Wolrich et al. | |
| 6,377,956 B1 * | 4/2002 | Hsu | G06F 8/73 |
| 6,948,050 B1 * | 9/2005 | Gove | G06F 9/3851 712/35 |
| 7,036,106 B1 | 4/2006 | Wang et al. | |
| 7,058,793 B1 * | 6/2006 | Hartnett | G06F 9/3867 712/219 |
| 7,278,137 B1 * | 10/2007 | Fuhler | G06F 8/4434 717/151 |
| 7,290,159 B2 * | 10/2007 | Lamb | G06F 1/12 713/400 |
| 8,209,664 B2 * | 6/2012 | Yu | H04L 12/44 717/119 |
| 8,677,334 B2 * | 3/2014 | Canedo | G06F 11/261 717/149 |
| 8,812,752 B1 | 8/2014 | Shih et al. | |
| 8,856,047 B2 | 10/2014 | Chakrabarti | |
| 9,052,971 B2 * | 6/2015 | Frank | G06F 9/542 |
| 9,235,446 B2 | 1/2016 | Bruno | |
| 9,268,746 B2 * | 2/2016 | Sun | G06F 7/785 |
| 9,424,271 B2 | 8/2016 | Tata | |
| 2002/0154620 A1 * | 10/2002 | Azenkot | H04L 5/026 370/347 |
| 2002/0161763 A1 * | 10/2002 | Ye | G06F 21/55 |
| 2002/0188902 A1 | 12/2002 | Fan et al. | |
| 2004/0098713 A1 * | 5/2004 | Ogawa | G06F 8/443 717/160 |
| 2004/0158730 A1 * | 8/2004 | Sarkar | G06F 21/564 726/24 |
| 2004/0163053 A1 * | 8/2004 | Snider | G06F 17/5045 716/103 |
| 2004/0230934 A1 * | 11/2004 | Taylor | G06F 17/5027 326/38 |
| 2005/0102271 A1 * | 5/2005 | Robertson | G06F 16/2228 |
| 2005/0268135 A1 * | 12/2005 | Lamb | G06F 1/12 713/400 |
| 2007/0204137 A1 * | 8/2007 | Tran | G06F 9/30181 712/214 |
| 2007/0283337 A1 * | 12/2007 | Kasahara | G06F 8/456 717/149 |
| 2009/0089128 A1 | 4/2009 | Tkatch et al. | |
| 2009/0271412 A1 | 10/2009 | Lacapra et al. | |
| 2009/0313311 A1 * | 12/2009 | Hoffmann | G06F 11/2094 |
| 2009/0327458 A1 | 12/2009 | Liu | |
| 2010/0013842 A1 | 1/2010 | Green et al. | |
| 2010/0017450 A1 * | 1/2010 | Sun | G06F 7/785 708/401 |
| 2010/0050026 A1 * | 2/2010 | Okabe | G06F 9/3824 714/48 |
| 2010/0161652 A1 * | 6/2010 | Bellare | G06F 16/51 707/769 |
| 2010/0162212 A1 | 6/2010 | Stall et al. | |
| 2011/0019594 A1 * | 1/2011 | Lesaint | H04M 3/4217 370/271 |
| 2011/0154339 A1 * | 6/2011 | Lee | G06F 9/5027 718/100 |
| 2011/0258225 A1 | 10/2011 | Taylor | |
| 2011/0276789 A1 | 11/2011 | Chambers et al. | |
| 2011/0276962 A1 | 11/2011 | Chambers | |
| 2011/0313844 A1 | 12/2011 | Chandrannouli | |
| 2012/0016901 A1 | 1/2012 | Agarwal | |
| 2012/0131309 A1 * | 5/2012 | Johnson | G06F 9/30 712/41 |
| 2012/0133654 A1 * | 5/2012 | Redgrave | G06T 15/005 345/419 |
| 2012/0144376 A1 * | 6/2012 | Van Eijndhoven | G06F 8/456 717/146 |
| 2012/0311117 A1 | 12/2012 | Fulop et al. | |
| 2013/0054567 A1 | 2/2013 | Graefe | |
| 2013/0124467 A1 | 5/2013 | Naidu et al. | |
| 2013/0124474 A1 * | 5/2013 | Anderson | G06F 16/24534 707/634 |
| 2013/0152088 A1 | 6/2013 | Gkantsidis et al. | |
| 2013/0173560 A1 | 7/2013 | McNeill | |
| 2013/0282650 A1 * | 10/2013 | Zhang | G06F 16/283 707/605 |
| 2013/0304744 A1 | 11/2013 | McSherry et al. | |
| 2013/0318092 A1 | 11/2013 | Ashish | |
| 2014/0047422 A1 | 2/2014 | Ravi | |
| 2014/0115560 A1 | 4/2014 | Hutchison | |
| 2014/0172939 A1 | 6/2014 | McSherry | |
| 2014/0245298 A1 | 8/2014 | Zhou | |
| 2014/0278519 A1 * | 9/2014 | Brush | G06F 19/328 705/2 |
| 2014/0279850 A1 * | 9/2014 | Goyal | G06F 16/235 707/609 |
| 2014/0310281 A1 | 10/2014 | Sonnekh | |
| 2014/0380266 A1 * | 12/2014 | Bornhoevd | G06F 8/20 717/104 |
| 2015/0066383 A1 | 3/2015 | Wernicke | |
| 2015/0088827 A1 * | 3/2015 | Xu | G06F 3/0605 707/634 |

(56) References Cited

U.S. PATENT DOCUMENTS

| | | |
|---|---|---|
| 2015/0172369 A1 | 6/2015 | Surendran |
| 2015/0199010 A1 | 7/2015 | Coleman et al. |
| 2015/0254141 A1* | 9/2015 | Wertheimer ............ G06F 16/22 707/646 |

OTHER PUBLICATIONS

Roberto Lublinerman et al., Modular Code Generation from Synchronous Block Diagrams, Jan. 18-24, 2009, [Retrieved on Jan. 3, 2020]. Retrieved from the internet: <URL: http://www-verimag.imag.fr/~tripakis/papers/popl09.pdf> 12 Pages (1-12) (Year: 2009).*

Bhatotia et al., "Incoop: MapReduce for Incremental Computations" Cloud Computing, ACM, Oct. 26, 2011, pp. 1-14.

Boduo Li et al., A platform for scalable one-pass analytics using MapReduce, Jun. 12-16, 2011, [Retrieved on Mar. 12, 2018]. Retrieved from the internet: <URL: https://dl.acnn.org/citation.cfnn?id=1989426> 12 Pages(985-996) (Year: 2011).

Hayes and Shah, "Hourglass: A library for incremental processing on Hadoop," 2013 IEEE International Conference on Big Data. IEEE, Oct. 6, 2013, pp. 742-752.

International Preliminary Report on Patentability in International Application No. PCT/US2014/049496, dated Oct. 4, 2016, 12 pages.

International Search Report and Written Opinion in International Application No. PCT/US2014/049496, dated Nov. 19, 2014, 16 pages.

Jörg et al., "Incremental recomputations in MapReduce," Proceedings of The Third International Workshop on Cloud Data Management, Clouddb'11, Jan. 1, 2011, pp. 7-14.

McSherry et al., "Composable Incremental and Iterative Data-Parallel Computation with Naiad," TechReport No. MSR-TR-2012-105, Microsoft Research, Oct. 9, 2012, 20 pages.

Office Action issued in European Application No. 14752529.9, dated Jul. 11, 2017, 6 pages.

Office Action issued in European Application No. 14752529.9, dated Mar. 15, 2018, 4 pages.

Sethi et al., "SASH: Enabling continuous incremental analytic workflows on Hadoop," Data Engineering (ICDE), 2013 IEEE 29th International Conference on, IEEE, Apr. 8, 2013, pp. 1219-1230.

Vasiliki Kalavri et al., MapReduce: Limitations, Optimizations and Open Issues, IEEE 2013, [Retrieved on Mar. 12, 2018]. Retrieved from the internet: <URL: http://ieeexplore.ieee.org/stannp/stannp.jsp?tp=&arnunnber=6680946> 8 Pages (1031-1038) (Year: 2013).

Wang Lam et al., Muppet: MapReduce-Style Processing of Fast Data, 2012, [Retrieved on Mar. 12, 2018]. Retrieved from the internet: <URL: http://delivery.acnn.org/10.1145/2370000/2367520/p1814-lam.pdf> 12 Pages (1814-1825) (Year: 2012).

Yan et al., "IncMR: Incremental Data Processing based on MapReduce," Cloud Computing (Cloud), 2012 IEEE 5$^{th}$ International Conference on, IEEE, Jun. 24, 2012, pp. 534-541.

Zhang and Chen, "i$^2$MapReduce: Incremental Iterative MapReduce," Cloud-I '13 Proceedings of the 2nd International Workshop on Cloud Intelligence, Aug. 26, 2013, 4 pages.

CN Office Action issued in Chinese Application No. 201480077823.2, dated Feb. 2, 2019, 25 pages (with English Translation).

CN Office Action in Chinese Application No. 201480077823, dated Jul. 16, 2019, 7 pages (with English translation).

\* cited by examiner

INCREMENTAL PARALLEL PROCESSING OF DATA

CROSS-REFERENCE TO RELATED APPLICATION

This application is a continuation of U.S. application Ser. No. 14/989,867, filed Jan. 7, 2016, now issued as U.S. Pat. No. 10,025,620 which is a continuation of U.S. application Ser. No. 14/231,983, filed Apr. 1, 2014, now issued as U.S. Pat. No. 9,268,597, the contents of which are hereby incorporated by reference in their entireties.

BACKGROUND

Large-scale data processing may include parallel processing, which generally involves performing some operation over each element of a large data set simultaneously. The various operations may be chained together in a data-parallel pipeline to create an efficient mechanism for processing a data set. Production of the data set may involve "batch jobs" that are run periodically over a set of large, evolving inputs. As the inputs are updated, the previous output becomes more and more stale, so the pipeline is re-run on a regular basis.

SUMMARY

The present disclosure relates to performing incremental processing of data in a parallel processing system.

In general, one innovative aspect of the subject matter described in this specification can be embodied in methods that include the actions of identifying synchronous code including instructions specifying a computing operation to be performed on a set of data; transforming the synchronous code into a pipeline application including one or more pipeline objects, the pipeline application configured to be executed in parallel across a plurality of computing devices, each of the one or more pipeline objects configured to receive an input data set and produce an output data set; identifying a first input data set on which to execute the pipeline application; executing the pipeline application on a first input data set to produce a first output data set, the executing the pipeline application including executing each of the one or more pipeline objects in an order in which a previous pipeline object provides its output data set to a next pipeline object as its input data set; after executing the pipeline application on the first input data set, identifying a second input data set on which to execute the pipeline application; determining a set of differences between the first input data set and second input data set; and executing the pipeline application on the set of differences to produce a second output data set, the executing the pipeline application on the set of differences including executing each of the one or more pipeline objects includes each previous pipeline object in the order providing differences from its previous output data set to the next pipeline object as its input data set, and the second output data set including differences from the first output data set. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Reprocessing a complete input data set each time a pipeline is rerun may be wasteful, and for large pipelines the amount of time it takes to run the pipeline limits how frequently it can be run. However, by processing the differences between the first and second input data sets, the amount of time necessary to process subsequent data sets may be reduced, allowing the pipeline to produce updated output data sets more quickly. Further, as the designer only writes and maintains one version of synchronous code, the pitfalls of maintaining separate batch and incremental systems may be avoided.

The system can automatically derive changes that need to be done to the output given the changes in the input. This reduces or eliminate manual maintenance of the pipeline, which, in turn, also reduces costs. Correctness issues related to maintaining multiple versions of a pipeline may also be alleviated. In addition, processing only the changes to the input set may lead to a reduction of compute resources necessary for subsequent executions of the pipeline in cases where the input set has not changed significantly. Lower latency may also be obtained by processing only changes to the input set.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
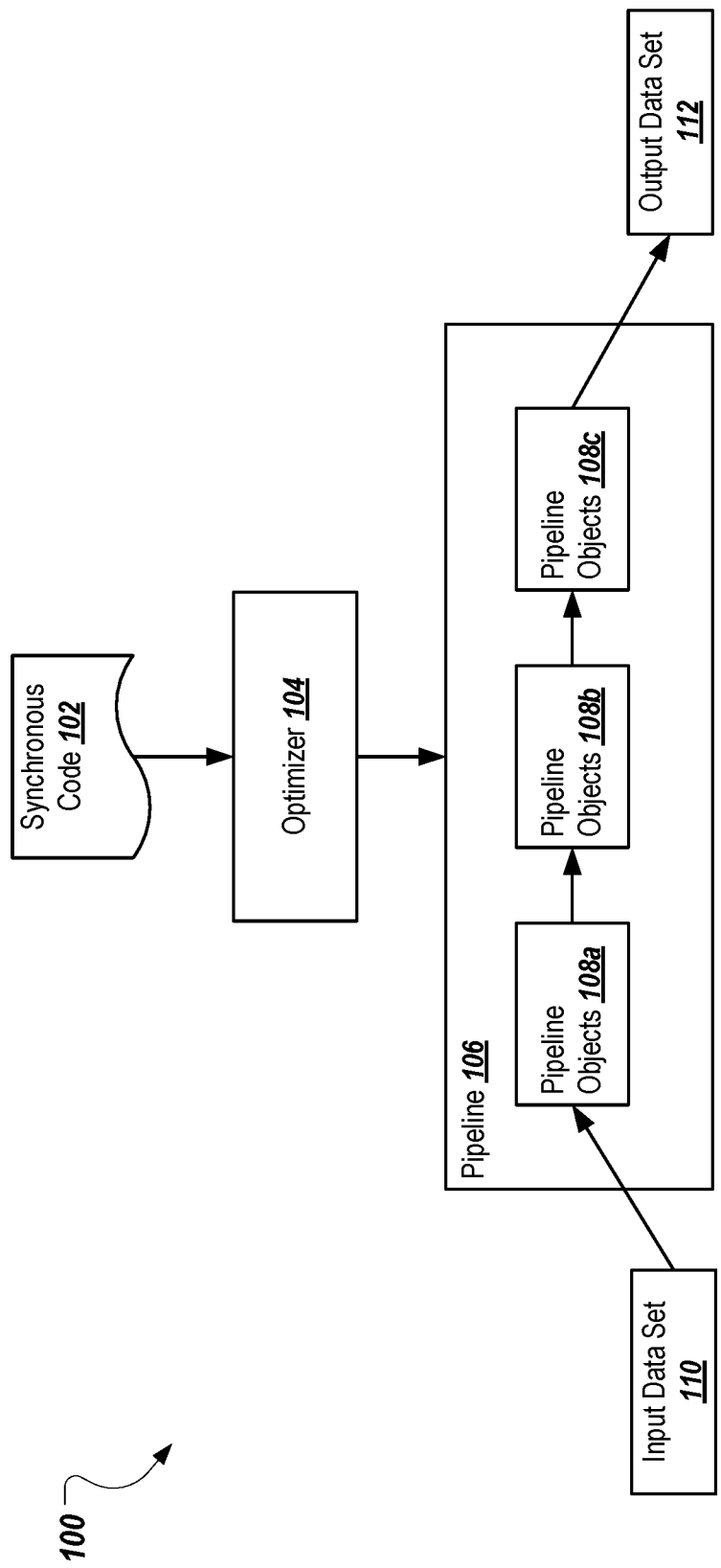
FIG. 1 is a block diagram of an environment in which incremental data processing can occur.

The present disclosure relates to performing incremental processing of data in a parallel processing system. In some implementations, a batch pipeline, viewed as an execution plan (as series of steps to be applied to some collection of records) is transformed into an incremental execution plan that can be executed on a set of differences (additions or removals from the original collection) to produce a set of differences that can be applied to the previous output collection to produce a collection equivalent to the collection that would have been produced by running the original pipeline on the entire new input. The system, in some implementations, also detects what the changes to the inputs are, and to applies the set of output differences to the final output.

Parallel processing frameworks provide a platform for processing large amounts of data in parallel by multiple computing devices. Users may define pipelines or pipeline applications including steps for processing an input data set to produce an output data set. One common parallel processing framework is the MapReduce framework, in which distributed computations are divided into a map step to divide an input set into smaller groups, and a reduce step to perform an operation on each of the groups. Such frameworks generally operate in a batch mode, such that an entire input data set must be processed by the pipeline each time it is run to produce an output data set, even if only a few values in the input data set have been added, changed or deleted since the pipeline was last run. This may lead to repeated processing of input, and high latency for large input data sets. For certain applications, output data that is more up to date than the frequency with which the pipeline can be run may be necessary. In such a case, a second system may be constructed to handle such incremental updates. Such an approach often adds complexity and maintenance overhead, especially as the original pipeline evolves. Being able to express the computation in a single framework and run the same code in both batch and incremental mode would be advantageous.

In addition, the ability to define both modes of operation in synchronous code is also desirable. Synchronous code contains programming instructions presenting a sequential series of steps. This is in contrast to "asynchronous" code which may be implemented as a finite state machine, an event handler, or other programming constructs that involve waiting for and responding to input. Generally, synchronous code is easier for humans to author and understand than asynchronous code, as the operation and program flow of asynchronous code may not be readily identifiable from the code itself.

Accordingly, the present disclosure describes a parallel data processing framework that allows for batch and incremental processing operations to be defined in synchronous code. One example method includes identifying the synchronous code and transforming it into a pipeline including pipeline objects. The pipeline may then be executed on a first input data set to produce a first output data set. When the pipeline is run on a second input data set, a set of differences between the first input data set and the second input data set is determined. The pipeline is then executed on these differences to produce a second output data set.

By processing the differences between the first and second input data sets, the amount of time necessary to process subsequent data sets may be reduced, allowing the pipeline to produce updated output data sets more quickly. Further, as the designer only writes and maintains one set of synchronous code, the pitfalls of maintaining separate batch and incremental systems may be avoided.

FIG. 1 is a block diagram of an environment 100 in which incremental data processing can occur. Environment 100 includes an optimizer 104 that analyzes synchronous code 102 including instructions for processing and input data set 110 in producing output data set 112. In operation, the optimizer 104 analyzes the synchronous code 102 to produce a pipeline 106 that may be executed in parallel on different computing devices. The pipeline 106 includes one or more pipeline objects 108a-c that perform the processing steps defined by the synchronous code 102 on the input data set 110.

Environment 100 includes an optimizer 104. As shown, the optimizer 104 is operable to analyze the synchronous code 102 and produce the pipeline 106. In some implementations, the optimizer 104 may be a software program or set of software programs operable to analyze the synchronous code 102 and produce the corresponding pipeline 106 to perform the data processing actions defined by the synchronous code 102. The optimizer 104 may also be a software library that may be imported by the author into the synchronous code 102, and may be executed when the synchronous code 102 is compiled and run. In some implementations, the optimizer 104 may be a server or set of servers to which the synchronous code 102 may be submitted, such as through an Application Programming Interface (API), over a network via one or more network protocols, or through other mechanisms.

In some implementations, the optimizer 104 may determine whether to produce a pipeline that operates in batch mode, such that the entire input data set 110 is processed each time the pipeline is run, or incremental mode, such that only differences in the input data set 110 from the last run are processed. In some cases, this determination may be made based on input to the optimizer 104 by a user. The determination may also be made automatically by the optimizer 104, such as by analyzing the synchronous code 102, the input data set 110, or based on other analysis. For example, the optimizer 104 may examine the size of the input data set 110 and determine that, because it contains few items, a batch mode pipeline should be produced. In another example, the optimizer 104 may examine the size of the input data set 110 and determine that the set contains a large number of items. The optimizer 104 may also determine, such as by interaction with a user, that the pipeline to be produced is to be run often. In such a case, the optimizer 104 may determine that an incremental mode pipeline should be produced.

The synchronous code 102 may include instructions for processing the input data set 110 to produce the output data set 112. For example, the synchronous code 102 may include a series of sequential instructions describing how the input data set is to be processed. The sequential instructions included in the synchronous code 102 may be function calls, procedure calls, loops, conditionals, or other programming language instructions. The synchronous code 102 is "synchronous" in the sense that it presents a sequential series of steps. This is in contrast to "asynchronous" code, which may be implemented as a finite state machine, an event handler, or other programming constructs that involve waiting for and responding to input. Generally, synchronous code is easier for humans to author and understand, as the operation and program flow of asynchronous code may not be readily identifiable from the code itself.

In some implementations, the synchronous code 102 may include instructions coded according to a programming language, such as, for example, JAVA, PYTHON, PERL, C, C++, C#, JAVASCRIPT, or other programming languages or combinations of processing languages. In some cases, synchronous code 102 may be embedded within a larger application, such that only a portion of the application's code is optimized by the optimizer 104.

The optimizer 104 analyzes (e.g., transforms) synchronous code 102 to produce the pipeline 106. In some implementations, the pipeline 106 is a distributed application operable to perform the operations defined in the synchronous code 102. In some implementations, the optimizer 104 may create the pipeline 106 when the synchronous code 102 is executed. The optimizer 104 may deploy the pipeline 106 across one or more servers, and instantiate the pipeline 106 to begin the processing of the input data set 110. In some implementations, the optimizer 104 may communicate with other components within the environment 102 deploy the pipeline 106 for execution.

As shown, the pipeline 106 includes one or more pipeline objects 108a-c. In some implementations, the pipeline objects 108a-c each correspond to an instruction or set of instructions within the synchronous code 102. The optimizer 104 creates and executes the pipeline objects 108a-c in response to such instructions in the synchronous code 104. In some implementations, the pipeline objects 108a-c may be independent software programs that may be run on separate servers in parallel. The pipeline objects 108a-c may be arranged in an execution order, such that the output of one pipeline object (e.g., 108a) may serve as input to another pipeline object (e.g., 108b). The operation of the pipeline objects 108a-c is discussed in greater detail relative to FIG. 3.

In operation, the pipeline objects 108a-c perform various operations or transformations on the input data set 110 to produce the output data set 112. In some implementations, the optimizer 104 generates the pipeline objects 108a-c based on a mapping of synchronous code instructions to types of pipelines objects. For example, in a case where the synchronous code 102 defines a MapReduce operation, the pipeline object 108a may be a mapper object generated in response to a map( ) function in the synchronous code 102, the pipeline object 108b may be a shuffler object generated in response to a shuffle( ) function in the synchronous code 102, and the pipeline object 108c may be a reducer object generated in response to a reduce( ) function in the synchronous code 102. The pipeline objects 108a-c may also perform other operations, such as, for example, aggregation, combination, grouping by keys, flattening, joining, counting, removing duplicate items, and other operations and may be generated in generated in response to corresponding functions in the synchronous code 102.

Environment 100 also includes an input data set 110 to be processed by the pipeline 106. In some implementations, the input data set 110 may be a database table, a text or binary file, a data stream, a collection of data shards, a collection of key value pairs, or another type of data set or combination of types of data sets. In some implementations, the input data set 110 may be received by the pipeline 106, such as over a network or as standard input to a program. The input data set 110 may also be requested or retrieved by the pipeline 106 on startup or incrementally as execution proceeds.

The environment 100 also includes output data set 112. In operation, the output data set 112 is produced by the pipeline 106 by processing the input data set 110. The output data set 112 represents the end product of the operation defined by the synchronous code 102. For example, if synchronous code 102 defines an operation in which occurrences of each letter within the input set 110 are to be counted, the output data set 112 may include a collection of counts for each letter. In some implementations, the output data set may be updated by the pipeline 106 as the operation occurs. In some cases, the output data set 112 may be produced at the conclusion of execution of the pipeline 106. The output data set 112 may be a collection of data, such as, for example, a database table or collection of database tables, a text file, a set of key value pairs, a data stream, or other types of data.

Figure 2:
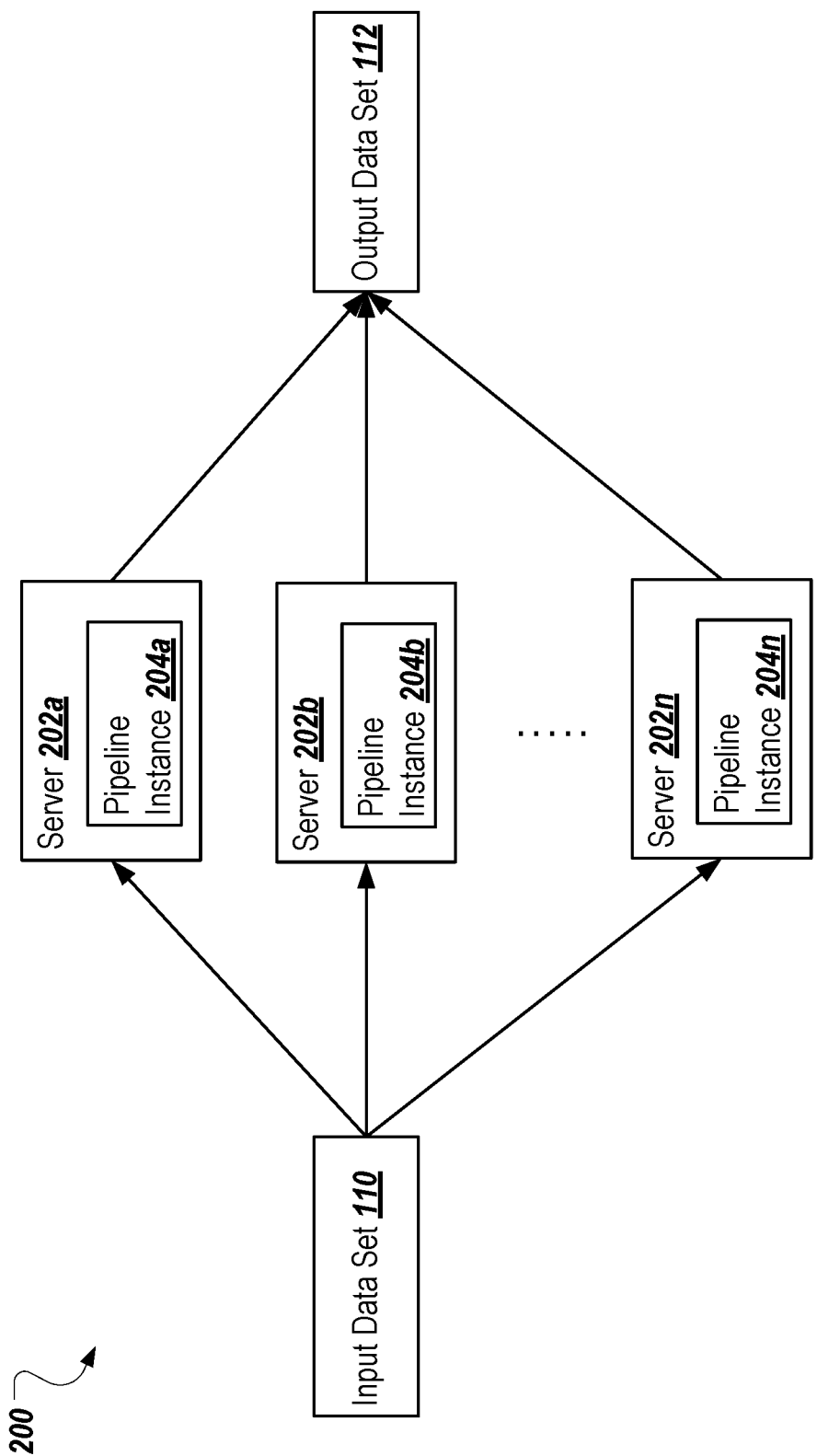
FIG. 2 is a block diagram of a system in which an input data set is processed in parallel by pipeline instances.

FIG. 2 is a block diagram of a system 200 in which an input data set is processed in parallel by pipeline instances. As shown, the system 200 includes one or more servers 202a-n each running a pipeline instance 204a-n. Each pipeline instance 204a-n may be identical, may be configured to process different portions of the input data set 110. In some implementations, each pipeline instance 204a-n may execute across multiple of the server 202a-n. In some cases, each of the pipeline objects included in each pipeline instance may be run on different servers. In addition, other components, such as splitters and combiners operating on input data set 110 or intermediate results produced by the pipeline instances 204a-n, may be included in the system 200. In some implementations, the optimizer 104 may determine an execution plan for the pipeline 106, and may deploy the pipeline instances 204a-n on the servers 202a-n. The optimizer 104 may determine the number of servers and pipeline instances to create and how to configure the servers and pipeline instances based on an analysis of the input data set 110, the synchronous code 102, parameters provided by a user, or other factors.

Figure 3:
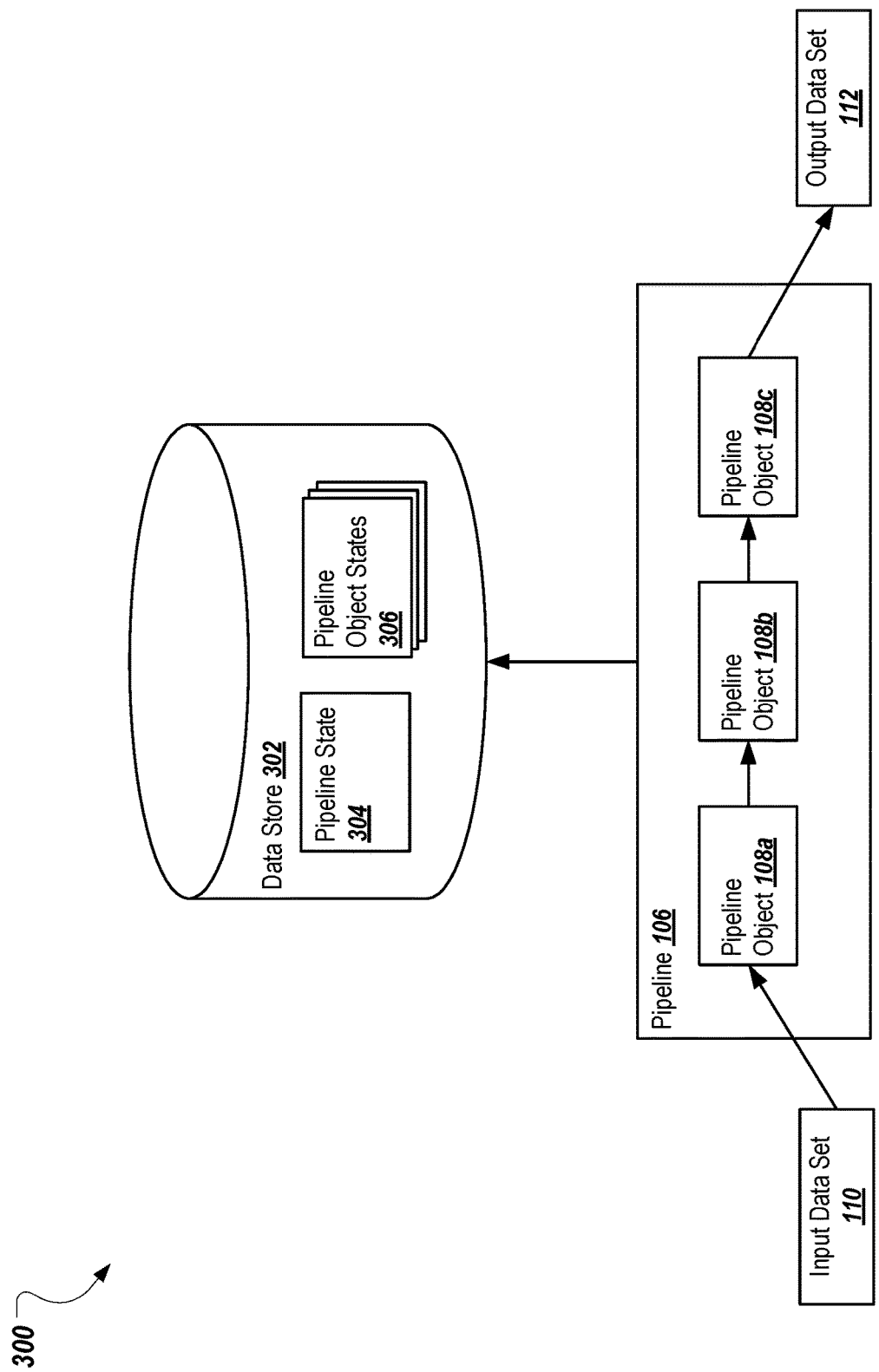
FIG. 3 is a blocking diagram of an environment in which a pipeline and pipeline object included in it store states for use in incremental data processing.

FIG. 3 is a block diagram of an environment 300 in which the pipeline 106 and pipeline objects 108a-c store states for use in incremental data processing. As shown, the environment 300 includes a data store 302. In operation, the pipeline 106 and the pipeline objects 108a-c store pipeline state 304 and pipeline objects states 306, respectively, in the data store 302. The pipeline state 304 may represent an overall state of the pipeline 106 as of its last execution. The pipeline object states 306 may represent states of the individual pipeline objects 108a-c as of the last execution of the pipeline 106. By consulting the pipeline state 304 and the pipeline object states 306, the pipeline 106 and the pipeline objects 108a-c may compare data being processed to data from the previous execution in order to implement incremental mode operation of the pipeline 106.

The data store 302 may be a database, a file system, a key value store, or other type of data store. The pipeline 106 and the pipeline objects 108a-c may write to and read from the data store 302 during execution the pipeline 106. The data store 302 may be a central data store as shown in FIG. 3, or may be a distributed story including a plurality of nodes. In some implementations, the data store 302 may include storage associated with each server executing the pipeline 106, such as the servers 202a-n from FIG. 2.

The data store 302 includes a pipeline state 304. In some implementations, the pipeline state 304 may be a representation of the previous execution of the pipeline 106. The data store 302 may store multiple pipeline states 304. In some cases, each instance of the pipeline 106 may store a different pipeline state 304. The pipeline state 304 may store representation of the input data set 110 for the last execution of the pipeline 106. The pipeline 106 may update the pipeline state 304 to indicate changes in the input data set 110 for each execution. For example, the pipeline 106 may, for each item in the input data set 110, check the pipeline state 304 to determine if the item was processed during the last execution of the pipeline 106. If the item was not processed in the last execution, the pipeline 106 may add the new item to the pipeline state 304, and may begin processing process the item in the current execution. By checking the pipeline state 304 in this manner, the pipeline 106 may avoid processing items processed during the previous execution, and thus implement an incremental processing mode. The pipeline 106 may also determine items that have been removed from the input data set 110, and remove these items from the pipeline state 304.

In some implementations, the pipeline state 304 may be stored as a set of items in the data store 302. In a case where the input data set 110 is stored in the same or a similar data store, the pipeline 106 may perform a set comparison between the input data set 110 and the pipeline state 304 to determine differences between the two sets. The pipeline 106 may then process these differences to produce the output data set 112.

In some implementations, the pipeline state 304 may include representation of the output data set 112 for the last execution of the pipeline 106. The pipeline 106 may update this representation of the output data set 112 as new items from the input data set 110 are processed, and as deleted items from the input data set 110 are identified. The pipeline 106 may then produce this updated output data set 112 as its output for the current execution. In some cases, the pipeline 106 may produce only new output (e.g., output generated by new input data) instead of the full output data set 112.

The data store 302 also includes pipeline object states 306. In some cases, each of the pipeline object states 306 corresponds to one of the pipeline objects 108a-c. The pipeline object states 306 may store state information associated with the individual pipeline objects 108a-c from the previous execution of the pipeline 106. The pipeline objects 108a-c may use this previous state data when operating in incremental mode. For example, an aggregator object that produces counts of different items encountered in the input data set 110 may produce incomplete or erroneous results if it is only presented with changes to the input data set 110 during execution. By storing the item counts encountered in the input data set 110 for the previous execution, the aggregator may update these counts during execution of the pipeline 106, and produce updated results indicative of the modified input data set 110. In some implementations, the pipeline object states 306 may be stored as key value pairs with a compound key including the item's key found in the input data set 110 and an identifier for the pipeline object associated with the state.

Figure 4:
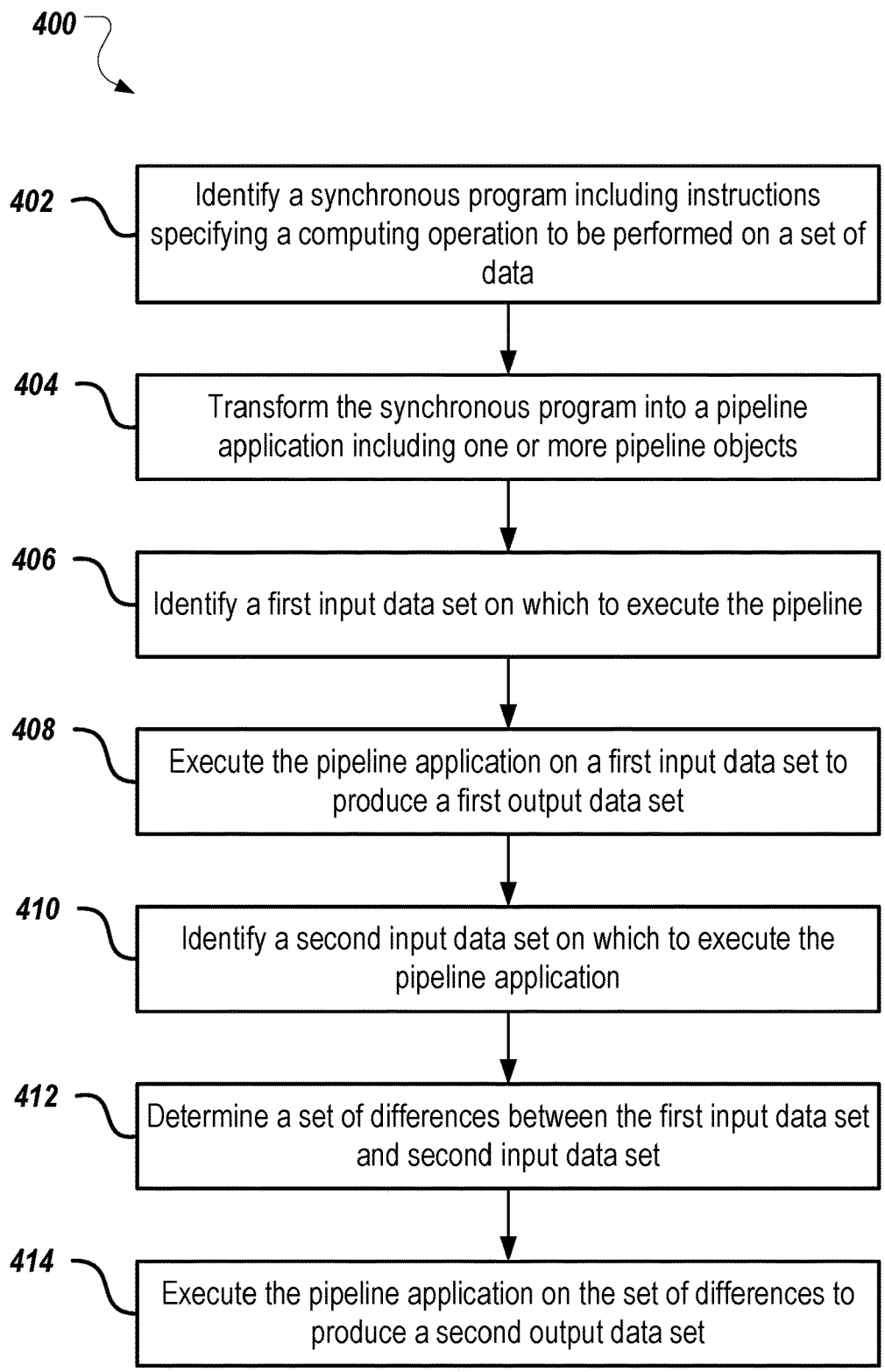
FIG. 4 is a flow diagram of an example process for incremental data processing.

FIG. 4 is a flow diagram of an example process 400 for incremental data processing. At 402, synchronous code including instructions specifying a computing operation to be performed on a set of data is identified. For example, an application (such as the optimizer 104 from FIG. 1) may be executed on the synchronous code. The synchronous code may also be identified during a compilation, building, or interpretation step. In some implementations, the synchronous code may be unsuitable in itself for processing changes to an input set. In such cases, a new pipeline may be derived from the synchronous code that operates on changes to the input set to produce corresponding changes to the output set.

At 404, the synchronous code is transformed into a pipeline application including one or more pipeline objects. In some implementations, the transformation involves instantiating new software objects or programs to implement the steps of the synchronous code, such as the pipeline object 108a-c described relative to FIG. 1. In some cases, the transformation of the synchronous code may be performed based on the size or other attributes of the input data set. For example, the synchronous code may be transformed into a single instance of a pipeline for a small input data set (e.g., one that can be processed quickly on a single computing device), but may be transformed into multiple distributed pipeline instances on different servers for a large input data set (e.g., one that cannot be processed in a reasonable amount of time on a single computing device).

At 406, first input data set on which to execute the pipeline application is identified. In some cases, the first input data set is transformed into a first set of key value pairs and stored in a key value store. The first input data set may be a data stream, a database table, a file or set of files, or another type of data set.

At 408, the pipeline application is executed on the first input data set to produce a first output data set. In some cases, executing the pipeline application includes processing all items in the first input data set with the pipeline objects included in the pipeline application to produce the first output data set.

At 410, a second input data set on which to execute the pipeline application is identified after executing the pipeline application on the first input data set. In some cases, the second input data set may be the first input data set with a number of additional and/or deleted items. At 412, a set of differences between the first input data set and the second input data set is determined. In some implementations, determining the differences includes transforming the second input data set into a second set of key value pairs, comparing the second set of key value pairs to first set of key value pairs, and identifying key value pairs that have been added or deleted from the second set of key value pairs relative to the first set of key value pairs. Determining the differences may also include determining a last execution timestamp for the pipeline representing a time at which the pipeline was executed on the first input data set, and identifying a set of items in the second input data set including timestamps after the last execution timestamp. At 414, the pipeline application is executed on the set of differences to produce a second output data set.

Figure 5:
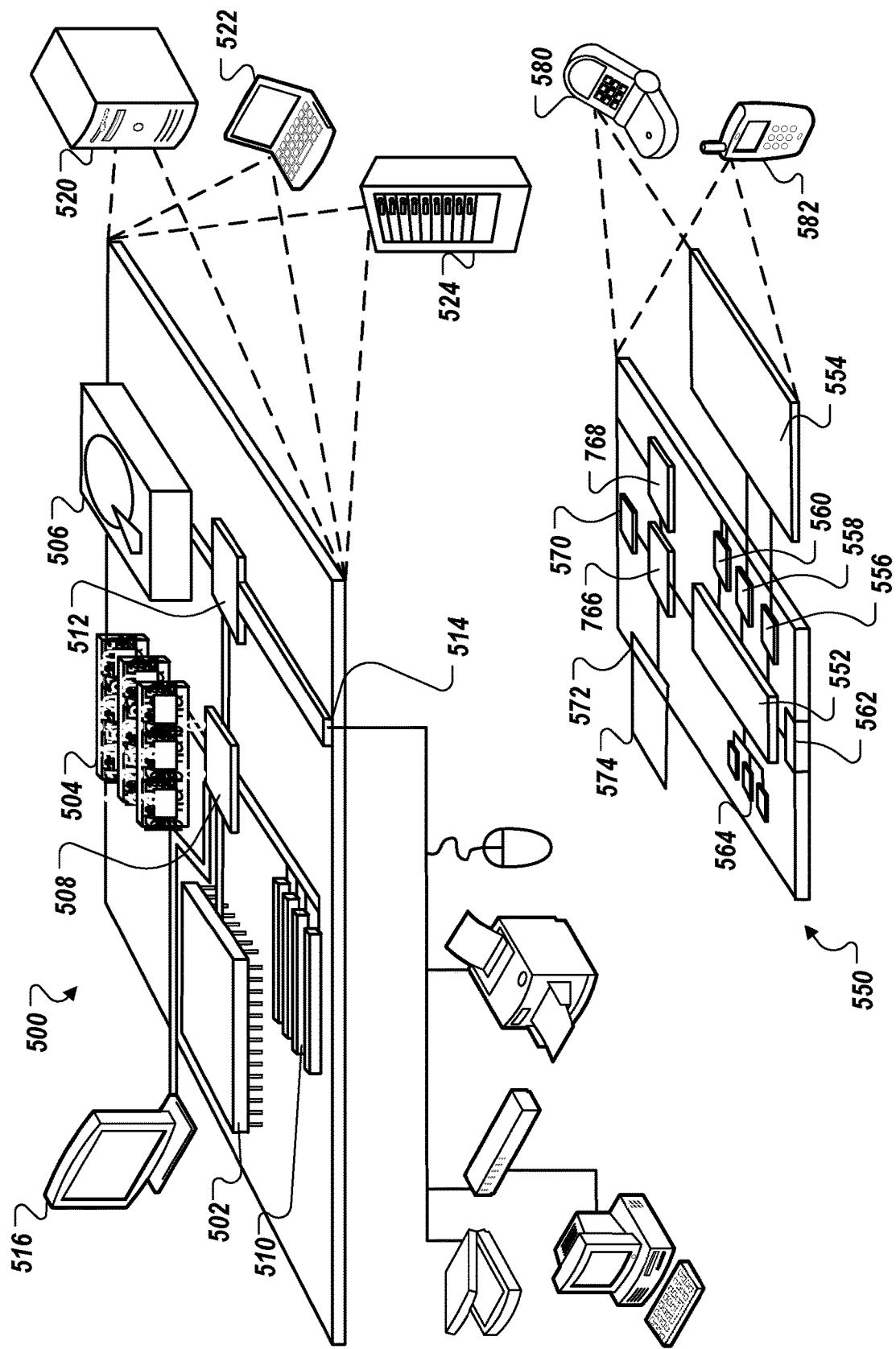
FIG. 5 is a block diagram of an example computing device.

In some cases, the process 400 includes determining a pipeline state in response to executing the pipeline on the first input data set, the pipeline state including a representation of the first input data set and the first output data set. The pipeline state may be updated in response to executing the pipeline on the set of differences from the first input data set to generate an updated pipeline state, the updated pipeline state including a representation of the second input data set and the second output data set. In some cases, a pipeline object state may be determined for each of the one or more pipeline objects in response to executing the pipeline on the first input data set, the pipeline object state including a representation of the input data set and the output data set for the pipeline object. The pipeline object state may also be updated in response to executing the pipeline on the set of differences from the first input data set to generate an updated pipeline object state, the updated pipeline object state including differences from the input data set and the output data set for the pipeline object FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk. The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed interface 508 manages bandwidth-intensive operations for the computing device 500, while the low speed interface 512 manages lower bandwidth-intensive operations. Such allocation of functions is exemplary only. In one implementation, the high-speed interface 508 is coupled to memory 504, display 516 (e.g., through a graphics processor or accelerator), and to high-speed expansion ports 510, which may accept various expansion cards (not shown). In the implementation, low-speed interface 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory 564 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    obtaining synchronous code including instructions that specify a computing operation such that both a batch mode pipeline and an incremental mode pipeline are operable to be produced from the synchronous code;
    obtaining a set of data to be processed with the synchronous code;
    determining that a frequency that a pipeline to be produced from the synchronous code is be run satisfies a batch mode pipeline criteria;
    in response to determining that the frequency that the pipeline to be produced from the synchronous code is be run number of items in the set of data satisfies the batch mode pipeline criteria, determining to produce, from the synchronous code, the batch mode pipeline that is configured to process an entirety of the set of data instead of the incremental mode pipeline that is configured to process only differences between the set of data and a prior set of data processed using the synchronous code;
    in response to determining to produce, from the synchronous code, the batch mode pipeline that is configured to process the entirety of the set of data instead of the incremental mode pipeline that is configured to process only differences between the set of data and the prior set of data processed using the synchronous code, producing the batch mode pipeline; and
    executing the batch mode pipeline on the set of data instead of the differences between the set of data and the prior set of data processed with the synchronous code.

2. The method of claim 1, comprising:
    determining a number of items in the set of data,
    wherein determining to produce, from the synchronous code, the batch mode pipeline that is configured to process an entirety of the set of data instead of the incremental mode pipeline that is configured to process only differences between the set of data and a prior set of data processed using the synchronous code is further determined based on the number of items in the set of data.

3. The method of claim 1, wherein determining a frequency that a pipeline to be produced from the synchronous code is be run comprises:
   determining that the pipeline to be produced is not to be run often.

4. The method of claim 1, wherein obtaining synchronous code including instructions specifying a computing operation comprises:
   obtaining programming instructions that represent a sequential series of steps of the computing operation.

5. The method of claim 1, wherein in response to determining to produce, from the synchronous code, the batch mode pipeline that is configured to process the entirety of the set of data instead of the incremental mode pipeline that is configured to process only differences between the set of data and the prior set of data processed using the synchronous code, producing the batch mode pipeline comprises:
   producing, as the batch mode pipeline, multiple pipeline objects that include a first pipeline object and a second pipeline object, where the first pipeline object receives the set of data as input and the second pipeline objects receives output of the first pipeline object as input to the second pipeline.

6. The method of claim 1, wherein executing the batch mode pipeline on the set of data instead of the differences between the set of data and the prior set of data processed with the synchronous code comprises:
   providing the entirety of the set of data as input to the batch mode pipeline.

7. The method of claim 1, comprising:
   obtaining a second, different set of data to be processed with the synchronous code;
   determining to produce, from the synchronous code and based on a size of the second, different set of data to be processed with the synchronous code, the incremental mode pipeline; and
   executing the incremental mode pipeline on the second, different set of data.

8. A system comprising:
   one or more computers and one or more storage devices storing instructions that are operable, when executed by the one or more computers, to cause the one or more computers to perform operations comprising:
   obtaining synchronous code including instructions that specify a computing operation such that both a batch mode pipeline and an incremental mode pipeline are operable to be produced from the synchronous code;
   obtaining a set of data to be processed with the synchronous code;
   determining that a frequency that a pipeline to be produced from the synchronous code is be run satisfies a batch mode pipeline criteria;
   in response to determining that the frequency that the pipeline to be produced from the synchronous code is be run satisfies the batch mode pipeline criteria, determining to produce, from the synchronous code, the batch mode pipeline that is configured to process an entirety of the set of data instead of the incremental mode pipeline that is configured to process only differences between the set of data and a prior set of data processed using the synchronous code;
   in response to determining to produce, from the synchronous code, the batch mode pipeline that is configured to process the entirety of the set of data instead of the incremental mode pipeline that is configured to process only differences between the set of data and the prior set of data processed using the synchronous code, producing the batch mode pipeline; and
   executing the batch mode pipeline on the set of data instead of the differences between the set of data and the prior set of data processed with the synchronous code.

9. The system of claim 8, the operations comprising:
   determining a number of items in the set of data,
   wherein determining to produce, from the synchronous code, the batch mode pipeline that is configured to process an entirety of the set of data instead of the incremental mode pipeline that is configured to process only differences between the set of data and a prior set of data processed using the synchronous code is further determined based on the number of items in the set of data.

10. The system of claim 8, wherein determining a frequency that a pipeline to be produced from the synchronous code is be run comprises:
    determining that the pipeline to be produced is not to be run often.

11. The system of claim 8, wherein obtaining synchronous code including instructions specifying a computing operation comprises:
    obtaining programming instructions that represent a sequential series of steps of the computing operation.

12. The system of claim 8, wherein in response to determining to produce, from the synchronous code, the batch mode pipeline that is configured to process the entirety of the set of data instead of the incremental mode pipeline that is configured to process only differences between the set of data and the prior set of data processed using the synchronous code, producing the batch mode pipeline comprises:
    producing, as the batch mode pipeline, multiple pipeline objects that include a first pipeline object and a second pipeline object, where the first pipeline object receives the set of data as input and the second pipeline objects receives output of the first pipeline object as input to the second pipeline.

13. The system of claim 8, wherein executing the batch mode pipeline on the set of data instead of the differences between the set of data and the prior set of data processed with the synchronous code comprises:
    providing the entirety of the set of data as input to the batch mode pipeline.

14. The system of claim 8, the operations comprising:
    obtaining a second, different set of data to be processed with the synchronous code;
    determining to produce, from the synchronous code and based on a size of the second, different set of data to be processed with the synchronous code, the incremental mode pipeline; and
    executing the incremental mode pipeline on the second, different set of data.

15. A non-transitory computer-readable medium storing software comprising instructions executable by one or more computers which, upon such execution, cause the one or more computers to perform operations comprising:
    obtaining synchronous code including instructions that specify a computing operation such that both a batch mode pipeline and an incremental mode pipeline are operable to be produced from the synchronous code;

obtaining a set of data to be processed with the synchronous code;

determining that a frequency that a pipeline to be produced from the synchronous code is be run satisfies a batch mode pipeline criteria;

in response to determining that the frequency that the pipeline to be produced from the synchronous code is be run satisfies the batch mode pipeline criteria, determining to produce, from the synchronous code, the batch mode pipeline that is configured to process an entirety of the set of data instead of the incremental mode pipeline that is configured to process only differences between the set of data and a prior set of data processed using the synchronous code;

in response to determining to produce, from the synchronous code, the batch mode pipeline that is configured to process the entirety of the set of data instead of the incremental mode pipeline that is configured to process only differences between the set of data and the prior set of data processed using the synchronous code, producing the batch mode pipeline; and executing the batch mode pipeline on the set of data instead of the differences between the set of data and the prior set of data processed with the synchronous code.

16. The medium of claim 15, the operations comprising:
determining a number of items in the set of data,
wherein determining to produce, from the synchronous code, the batch mode pipeline that is configured to process an entirety of the set of data instead of the incremental mode pipeline that is configured to process only differences between the set of data and a prior set of data processed using the synchronous code is further determined based on the number of items in the set of data.

17. The medium of claim 15, wherein determining a frequency that a pipeline to be produced from the synchronous code is be run comprises:
determining that the pipeline to be produced is not to be run often.

18. The medium of claim 15, wherein obtaining synchronous code including instructions specifying a computing operation comprises:
obtaining programming instructions that represent a sequential series of steps of the computing operation.

19. The medium of claim 15, the operations comprising:
obtaining a second, different set of data to be processed with the synchronous code;
determining to produce, from the synchronous code and based on a size of the second, different set of data to be processed with the synchronous code, the incremental mode pipeline; and
executing the incremental mode pipeline on the second, different set of data.

* * * * *